United States Patent
Zhang et al.

(10) Patent No.: US 10,892,840 B2
(45) Date of Patent: Jan. 12, 2021

(54) METHOD AND APPARATUS FOR TDMA SLOT SYNCHRONIZATION AND CALIBRATION OF MASTER AND SLAVE

(71) Applicant: Harxon Corporation, Guangdong (CN)

(72) Inventors: Haijun Zhang, Guangdong (CN); Guanghui Huang, Guangdong (CN); Shiwei Wu, Guangdong (CN); Jie Zhang, Guangdong (CN)

(73) Assignee: HARXON CORPORATION, Guangdong (CN)

( * ) Notice: Subject to any disclaimer, the term of this patent is extended or adjusted under 35 U.S.C. 154(b) by 102 days.

(21) Appl. No.: 16/080,568

(22) PCT Filed: Oct. 11, 2017

(86) PCT No.: PCT/CN2017/105618
§ 371 (c)(1),
(2) Date: Aug. 28, 2018

(87) PCT Pub. No.: WO2018/227830
PCT Pub. Date: Dec. 20, 2018

(65) Prior Publication Data
US 2019/0173597 A1    Jun. 6, 2019

(30) Foreign Application Priority Data

Jun. 14, 2017  (CN) .......................... 2017 1 0446549

(51) Int. Cl.
*H04J 3/06* (2006.01)
*H04W 56/00* (2009.01)
*H04J 3/14* (2006.01)

(52) U.S. Cl.
CPC .......... *H04J 3/0644* (2013.01); *H04J 3/0647* (2013.01); *H04J 3/0655* (2013.01); *H04J 3/14* (2013.01);
(Continued)

(58) Field of Classification Search
CPC ...... H04J 3/0644; H04J 3/0655; H04J 3/0647; H04J 3/14; H04J 3/0652; H04W 56/004; H04W 56/0005
See application file for complete search history.

(56) References Cited

U.S. PATENT DOCUMENTS 6,698,022 B1    2/2004 Wu
6,975,610 B1 *  12/2005 Van Der Tuijn et al. ................... H04B 7/216
                                                                 370/335
(Continued)

FOREIGN PATENT DOCUMENTS

CN        1960242 A    5/2007
CN      106413075 A    2/2017
(Continued)

OTHER PUBLICATIONS

Lennvall et al., "A New Wireless Sensor Network TDMA Timing Synchronization Protocol", (Year: 2016).*

(Continued)

*Primary Examiner* — Justin T Van Roie
(74) *Attorney, Agent, or Firm* — David D. Brush; Westman, Champlin & Koehler, P.A.

(57) ABSTRACT

A method for TDMA slot synchronization and calibration of a master and a slave includes: receiving a synchronizing frame from the master by the slave, wherein the synchronizing frame includes a first count value of a timing counter of the master; analysing the synchronizing frame by the slave to acquire the first count value; and adjusting a TDMA slot of the slave according to the first count value and a second count value of a timing counter of the slave to synchronize the TDMA slot of the slave with a TDMA slot of the master.

8 Claims, 4 Drawing Sheets

(52) U.S. Cl.
CPC ..... *H04W 56/004* (2013.01); *H04W 56/0005* (2013.01)

(56) References Cited

U.S. PATENT DOCUMENTS

| | | | | |
|---|---|---|---|---|
| 7,296,124 | B1* | 11/2007 | Falik | G06F 13/1647 711/157 |
| 2003/0067873 | A1* | 4/2003 | Fuhrmann | H04L 12/40026 370/230 |
| 2004/0028071 | A1 | 2/2004 | Gehring et al. | |
| 2004/0196872 | A1* | 10/2004 | Nakamura | H04J 3/06 370/512 |
| 2005/0002336 | A1* | 1/2005 | Wego | H04J 3/0623 370/235 |
| 2016/0149610 | A1* | 5/2016 | Maki | H04J 3/0644 398/115 |
| 2016/0269136 | A1* | 9/2016 | Fair et al. | H04J 3/0658 370/336 |

FOREIGN PATENT DOCUMENTS

| | | |
|---|---|---|
| CN | 107040327 A | 8/2017 |
| EP | 3156904 A1 | 4/2017 |

OTHER PUBLICATIONS

English translation of the International Search Report dated Feb. 12, 2018, and Written Opinion dated Mar. 5, 2018, for corresponding International Application No. PCT/CN2017/105618, filed Oct. 11, 2017.

Chinese Office Action dated May 4, 2018, for Chinese Application No. 201710446549.7.

International Search Report dated Feb. 12, 2018 for corresponding International Application No. PCT/CN2017/105618, filed Oct. 11, 2017.

Written Opinion of the International Searching Authority dated Mar. 5, 2018, for corresponding International Application No. PCT/CN2017/105618, filed Oct. 11, 2017.

Office Action dated Feb. 12, 2020 for corresponding European Application No. 17895503.5.

* cited by examiner

METHOD AND APPARATUS FOR TDMA SLOT SYNCHRONIZATION AND CALIBRATION OF MASTER AND SLAVE

CROSS-REFERENCE TO RELATED APPLICATION

This application is a national phase entry under 35 U.S.C. § 371 of International Application PCT/CN2017/105618, filed Oct. 11, 2017, which claims priority to and benefits of Chinese Patent Application Serial No. 201710446549.7, with a title of "method and apparatus for TDMA slot synchronization and calibration of master and slave", filed with the State Intellectual Property Office of P. R. China on Jun. 14, 2017, the entire contents of which are incorporated herein by reference.

FIELD

The present disclosure relates to the field of data transmissions, and more particularly to a method and an apparatus for time division multiple access (TDMA) slot synchronization and calibration of a master and a slave.

BACKGROUND

In most of current TDMA slot synchronization methods, time slot synchronization is realized according to an accurate clock source provided by a real time clock (RTC) or a global position system (GPS) module. In other words, a clock source of the RTC or the GPS module is required to provide accurate clock information and such information may be used for time slot synchronization.

However, the clock source of the RTC or the GPS module not only increases costs, but also has limitations when being used. For example, when the GPS module is used indoor, the solution may not be realized since the GPS signal is weak or lost. When the clock source of the RTC is used, the RTC needs to be calibrated to ensure the accuracy of the clock information.

SUMMARY

The present disclosure seeks to solve at least one of the problems that exist in the related art to at least some extent. For this, embodiments of the present disclosure provide a method and a device for TDMA slot synchronization and calibration of a master and a slave.

Embodiments of a first aspect of the present disclosure provide a method for TDMA slot synchronization and calibration of a master and a slave, including:

receiving a synchronizing frame from a master by at least one slave, in which the synchronizing frame includes a first count value of a timing counter of the master;

analysing the synchronizing frame by the at least one slave to acquire the first count value;

adjusting a TDMA slot of each slave according to the first count value and a second count value of a timing counter of the slave to synchronize the TDMA slot of the slave with a TDMA slot of the master.

Alternatively, before receiving a synchronizing frame from a master by at least one slave, the method further includes:

performing a frequency division on a clock source of each slave to determine a time granularity of the timing counter of the slave;

setting a third count value of a compare register of the slave.

Alternatively, adjusting a TDMA slot of each slave according to the first count value and a second count value of a timing counter of the slave includes:

keeping the second count value of the timing counter of the slave unchanged if a difference between the first count value and the second count value is zero;

delaying the second count value of the timing counter of the slave by a first number A of the time granularities and subsequently controlling the timing counter to restart counting if the first count value is greater than the second count value and the difference between the first count value and the second count value is the first number A;

subtracting a second number B from the third count value of the compare register of the slave to acquire a fourth count value and controlling the timing counter to restart counting when the second count value reaches the fourth count value if the first count value is smaller than the second count value and the difference between the first count value and the second count value is the second number B.

Embodiments of a second aspect of the present disclosure provide a method for TDMA slot synchronization and calibration of a master and a slave, including:

acquiring a first count value of a timing counter by the master;

reading a third count value of a compare register by the master;

performing a preset interrupting program to generate a synchronizing frame and sending the synchronizing frame to at least one slave, and controlling the timing counter to restart counting, when the first count value is equal to the third count value.

Alternatively, before acquiring a first count value of a timing counter by the master, the method further includes:

performing a frequency division on a clock source of the master to determine a time granularity of the timing counter of the master;

setting the third count value of the compare register of the master.

Embodiments of a third aspect of the present disclosure provide an apparatus for TDMA slot synchronization and calibration of a master and a slave, provided in each slave and including:

a receiving module configured to receive a synchronizing frame from a master, in which the synchronizing frame includes a first count value of a timing counter of the master;

an analysing module configured to analyse the synchronizing frame by the slave to acquire the first count value;

an adjusting module configured to adjust a TDMA slot of the slave according to the first count value and a second count value of a timing counter of the slave to synchronize the TDMA slot of the slave with a TDMA slot of the master.

Alternatively, the apparatus further includes:

a first determining module configured to perform a frequency division on a clock source of the slave to determine a time granularity of the timing counter of the slave;

a first setting module configured to set a third count value of a compare register of the slave.

Alternatively, the adjusting module includes:

a first comparing unit configured to keep the second count value of the timing counter of the slave unchanged if a difference between the first count value and the second count value is zero;

a second comparing unit configured to delay the second count value of the timing counter of the slave by a first number A of the time granularities and subsequently control the timing counter to restart counting if the first count value is greater than the second count value and the difference between the first count value and the second count value is the first number A;

a third comparing unit configured to subtract a second number B from the third count value of the compare register of the slave to acquire a fourth count value and control the timing counter to restart counting when the second count value reaches the fourth count value if the first count value is smaller than the second count value and the difference between the first count value and the second count value is the second number B.

Embodiments of a fourth aspect of the present disclosure provide an apparatus for TDMA slot synchronization and calibration of a master and a slave, provided in each slave and including:

an acquiring module configured to acquire a first count value of a timing counter of the master;

a reading module configured to read a third count value of a compare register of the master;

a generating module configured to perform a preset interrupting program to generate a synchronizing frame and send the synchronizing frame to at least one slave, and control the timing counter to restart counting, when the first count value is equal to the third count value.

Alternatively, the apparatus further includes:

a second determining module configured to perform a frequency division on a clock source of the master to determine a time granularity of the timing counter of the master;

a second setting module configured to set the third count value of the compare register of the master.

The technical solutions provided by the embodiments of the present disclosure may include the following beneficial effects.

According to the method provided in the embodiments of the present disclosure, the synchronizing frame generated by the master is received, then analysing is performed to acquire the first count value included in the synchronizing frame, and finally the TDMA slot of the slave is adjusted according to the first count value and the second count value of the local timing counter. It can be seen that, in the present disclosure, the synchronization is realized by directly using the respective clock sources of the master and the slave, without addition of the clock source of the RTC or the GPS module, thus reducing the cost and improving the accuracy.

It should be understood that both the foregoing general description and the following detailed description are only exemplary and explanatory, which shall not be construed to limit the present disclosure.

BRIEF DESCRIPTION OF THE DRAWINGS

Drawings which are incorporated in and constitute a part of the specification illustrate embodiments consistent with the present disclosure and serve to explain the principle of the present disclosure together with the description.

DETAILED DESCRIPTION

Figure 1:
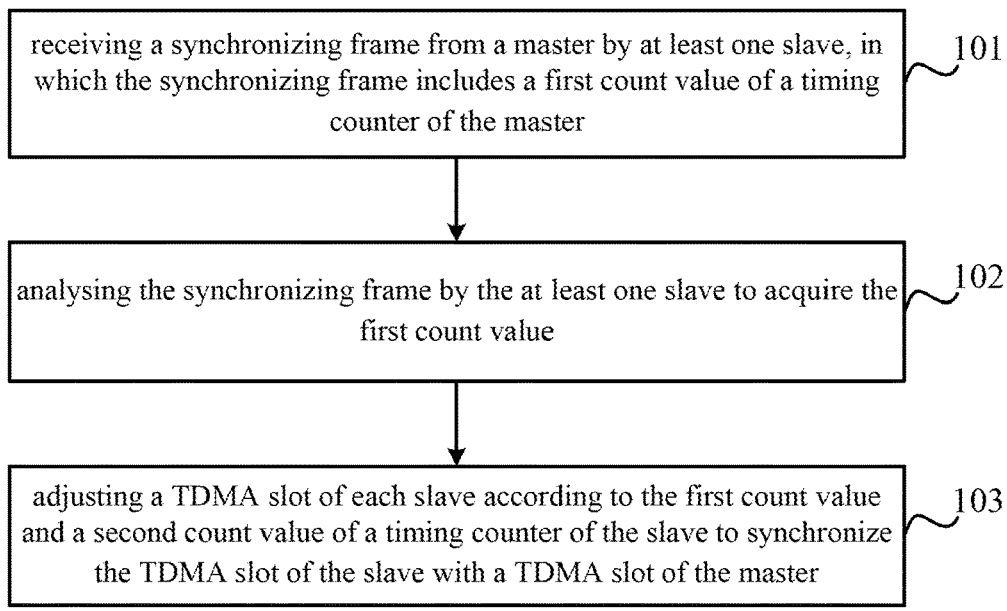
FIG. 1 is a flow chart of a method for TDMA slot synchronization and calibration of a master and a slave according to an embodiment of the present disclosure.

Reference will be made in detail to embodiments of the present disclosure. The embodiments described herein with reference to drawings are explanatory. The same or similar elements are denoted by same reference numerals in different drawings unless indicated otherwise. The embodiments described in the following exemplary embodiments do not represent all embodiments consistent with the present invention. Instead, they are merely examples of apparatus and methods according to some aspects of the present disclosure as detailed in the claims.

FIG. 1 is a flow chart of a method for TDMA slot synchronization and calibration of a master and a slave according to an embodiment of the present disclosure. As shown in FIG. 1, the method for TDMA slot synchronization and calibration of a master and a slave includes following steps.

At step 101, at least one slave receives a synchronizing frame from a master, in which the synchronizing frame includes a first count value of a timing counter of the master.

At step 102, the synchronizing frame is analysed by the at least one slave to acquire the first count value.

At step 103, a TDMA slot of each slave is adjusted according to the first count value and a second count value of a timing counter of the slave to synchronize the TDMA slot of the slave with a TDMA slot of the master.

A following interaction process between the master and at least one slave is used to describe the above method for TDMA slot synchronization and calibration of a master and a slave.

In the embodiment of the present application, build-in clock sources, which are provided in a microcontroller (MCU) of the master and the slave, are used as a clock source for the TDMA slot synchronization.

In an embodiment of the present disclosure, first, a frequency division is performed on a clock source of the MCU of the master to determine a time granularity of a timing counter of the master. Each time granularity is usually in a millisecond level. Then, an operating mode of a compare register in the master is set, for example, an auto-reload function of the timing counter is realized, i.e., the timing counter is able to restart counting, and a third count value of the compare register in the master is set. When the first count value of the timing counter is equal to the third count value of the compare register, the controller in the master generates an interrupting signal to execute a preset interrupting program, and at the same time, the first count value of the timing counter is automatically cleared and the timing counter restarts counting.

For example, a TDMA slot may be defined as 20 ms, and the first count value of the timing counter may be set so as to acquire a count value of 20 ms each time. When it reaches 20 ms, an interrupting signal is generated and an interrupting program is performed, and the timing counter restarts counting.

Normally, there will be one master and at least one slave in a TDMA system. Since the timing counters of the master and the slave may not start at the same time, the TDMA slot calibration is required to perform on the slaves so as to synchronize the time slot of the slave with that of the master.

In order to keep the time slot of the slave consistent with the time slot of the master, in one embodiment of the present disclosure, the synchronizing frame including the first count value of the timing counter of the master is constructed and sent to the at least one slave for reference. Then, the synchronizing frame is analysed by the slave to acquire the first count value carried in the synchronizing frame. After comparing the first count value with the local second count value, a difference between the two values is used to adjust the second count value of the local timing counter, thus achieving the object of time slot calibration.

Figure 2:
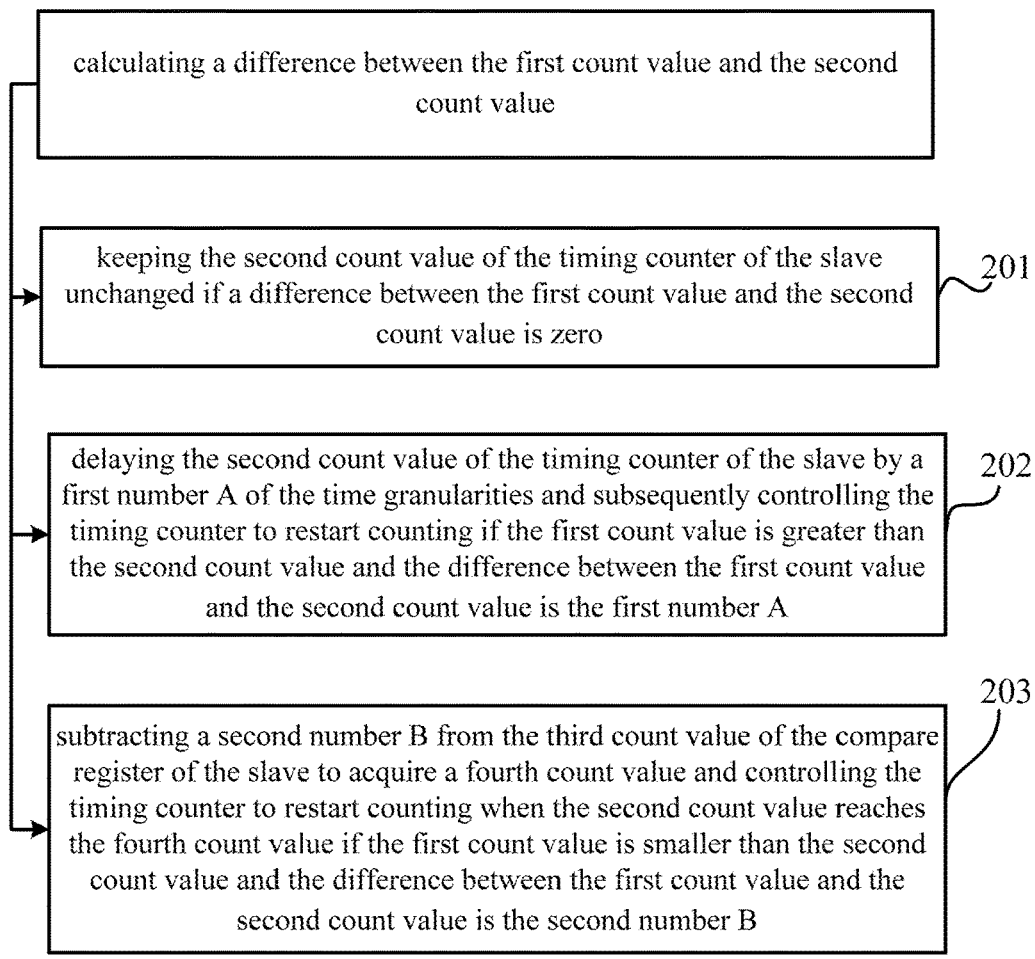
FIG. 2 is a flow chart of a method for TDMA slot synchronization and calibration of a master and a slave according to another embodiment of the present disclosure.

In an embodiment of the present disclosure, the synchronizing frame is sent to each slave by the master regularly, such that the TDMA slot of each slave may be synchronized with that of the master. As shown in FIG. 2, it includes following steps.

At step 201, if the first count value is the same with the second count value, i.e., a difference between the first count value and the second count value is zero, no slot calibration is needed to perform on the local timing counter of the slave.

At step 202, if the first count value carried by the synchronizing frame is greater than the second count value of the slave and the difference between the first count value and the second count value is the first number A, the second count value of the local timing counter of the salve is adjusted according to the first number A. In this case, the first number A is added on the basis of the second count value of the timing counter, such that the timing counter of the slave delays the interruption by the first number A of the time granularities and the count value is cleared and re-counted. Thus, it can be ensured that the second count value of the slave is synchronized with the first count value of the master after re-counting.

At step 203, if the first count value carried by the synchronizing frame is smaller than the second count value of the slave and the difference between the first count value and the second count value is the second number B, the second count value of the local timing counter of the salve is adjusted according to the second number B. In this case, the second number B is subtracted from the second count value, such that the timing counter of the slave interrupts in advance by the second number B of the time granularities and the count value is cleared and re-counted. Thus, it can be ensured that the second count value of the local timing counter is synchronized with the first count value of the master after re-counting.

On above basis, in the embodiments of the present disclosure, clock sources originally provided in the MCUs of the master and the slave, which are used as a clock source for TDMA slot synchronization, are used to synchronize the slave with the master. It can be seen that the solution of the present disclosure may simplify the operation and have a wide applicability, and does not require additional assembly cost.

Figure 3:
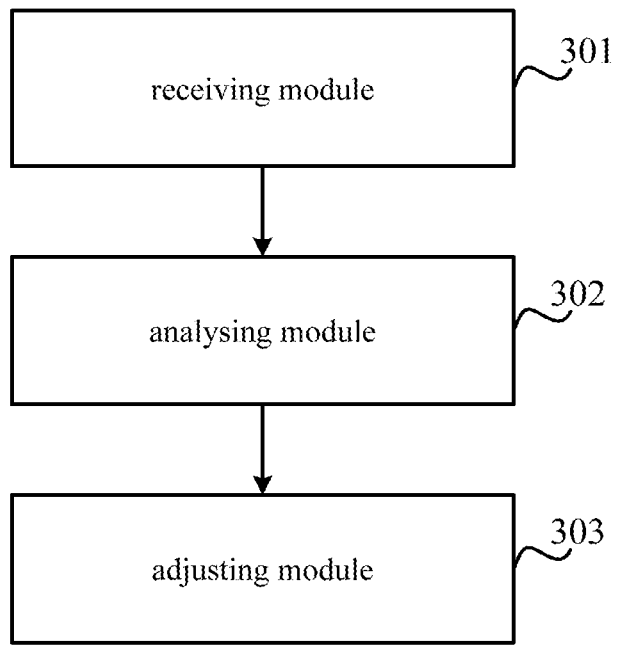
FIG. 3 is a block diagram of an apparatus for TDMA slot synchronization and calibration of a master and a slave according to an embodiment of the present disclosure.

In an embodiment of the present disclosure, an apparatus for TDMA slot synchronization and calibration of a master and a slave is provided in each slave. As shown in FIG. 3, the apparatus include:

a receiving module 301 configured to receive a synchronizing frame from a master, in which the synchronizing frame includes a first count value of a timing counter of the master;

an analysing module 302 configured to analyse the synchronizing frame by the slave to acquire the first count value;

an adjusting module 303 configured to adjust a TDMA slot of the slave according to the first count value and a second count value of a timing counter of the slave to synchronize the TDMA slot of the slave with a TDMA slot of the master.

Figure 4:
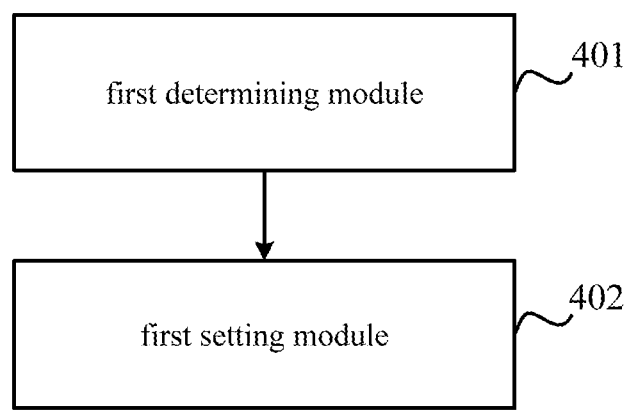
FIG. 4 is a block diagram of an apparatus for TDMA slot synchronization and calibration of a master and a slave according to another embodiment of the present disclosure.

Alternatively, as shown in FIG. 4, the apparatus further includes:

a first determining module 401 configured to perform a frequency division on a clock source of the slave to determine a time granularity of the timing counter of the slave;

a first setting module 402 configured to set a third count value of a compare register of the slave.

Figure 5:
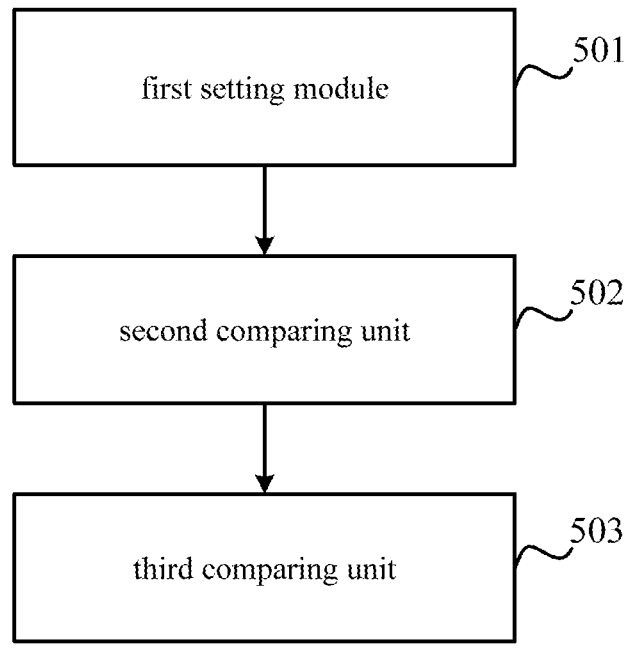
FIG. 5 is a block diagram of an apparatus for TDMA slot synchronization and calibration of a master and a slave according to a further embodiment of the present disclosure.

Alternatively, as shown in FIG. 5, the adjusting module includes:

a first comparing unit 501 configured to keep the second count value of the timing counter of the slave unchanged if a difference between the first count value and the second count value is zero;

a second comparing unit 502 configured to delay the second count value of the timing counter of the slave by a first number A of the time granularities and subsequently control the timing counter to restart counting if the first count value is greater than the second count value and the difference between the first count value and the second count value is the first number A;

a third comparing unit 503 configured to subtract a second number B from the third count value of the compare register of the slave to acquire a fourth count value and control the timing counter to restart counting when the second count value reaches the fourth count value if the first count value is smaller than the second count value and the difference between the first count value and the second count value is the second number B.

Figure 6:
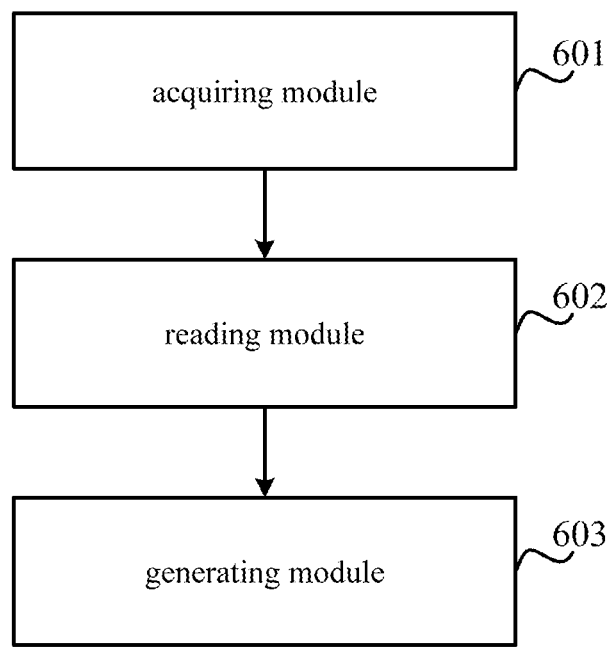
FIG. 6 is a block diagram of an apparatus for TDMA slot synchronization and calibration of a master and a slave according to a still further embodiment of the present disclosure.

According to embodiments of the fourth aspect of the present disclosure, an apparatus for TDMA slot synchronization and calibration of a master and a slave is provided in each slave. As shown in FIG. 6, the apparatus includes:

an acquiring module 601 configured to acquire a first count value of a timing counter of the master;

a reading module 602 configured to read a third count value of a compare register of the master;

a generating module 603 configured to perform a preset interrupting program to generate a synchronizing frame and send the synchronizing frame to at least one slave, and control the timing counter to restart counting, when the first count value is equal to the third count value.

Figure 7:
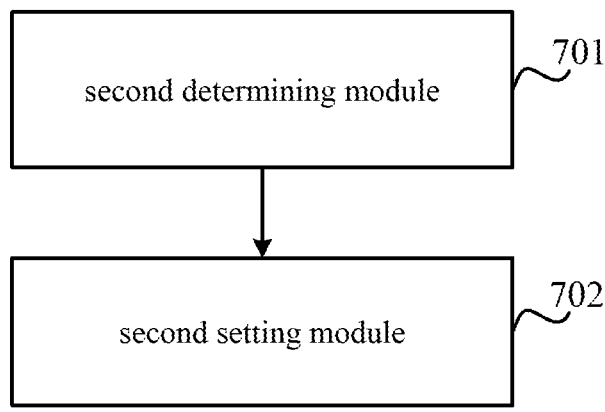
FIG. 7 is a block diagram of an apparatus for TDMA slot synchronization and calibration of a master and a slave according to a further embodiment of the present disclosure.

Alternatively, as shown in FIG. 7, the apparatus further includes:

a second determining module 701 configured to perform a frequency division on a clock source of the master to determine a time granularity of the timing counter of the master;

a second setting module 702 configured to set the third count value of the compare register of the master.

With regard to the apparatus in the above embodiments, the specific manners for operating the respective units or modules have been described in detail in the embodiments related to the method, and thus detailed descriptions do not need to be repeated herein.

Figure 8:
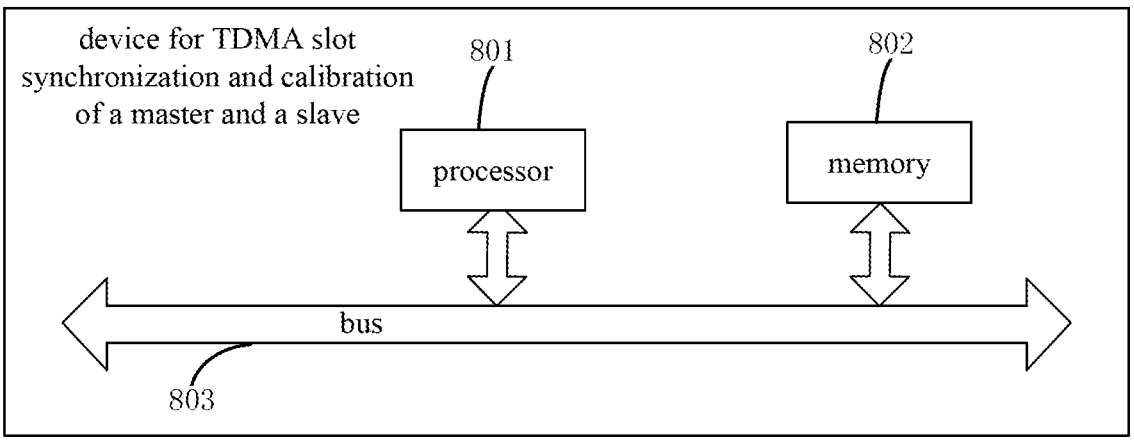
FIG. 8 is a block diagram of an apparatus for TDMA slot synchronization and calibration of a master and a slave according to a further embodiment of the present disclosure.

According to embodiments of a fifth aspect of the present disclosure, a device for TDMA slot synchronization and calibration of a master and a slave is provided in each slave. As shown in FIG. 8, the device includes at least one processor 801, and at least one memory 802 communicated with the processor 801, in which the memory 802 is configured to store program instructions executable by the processor 801, and the processor 801 is configured to call the program instructions to perform a method according to embodiments as shown in FIG. 1 and other related embodiments. For example, the method includes:

receiving a synchronizing frame from a master, in which the synchronizing frame includes a first count value of a timing counter of the master;

analysing the synchronizing frame to acquire the first count value;

adjusting a TDMA slot of the slave according to the first count value and a second count value of a timing counter of the slave to synchronize the TDMA slot of the slave with a TDMA slot of the master.

As shown in FIG. 8, in the embodiment, the processor 801 and the memory 802 are communicated with each other via a bus 803.

According to embodiments of a sixth aspect of the present disclosure, a computer program product is provided. The computer program product includes a computer program stored in a non-transitory computer-readable storage medium, in which the computer program includes program instructions that, when executed by a computer, cause the computer to perform a method according to embodiments as shown in FIG. 1 and other related embodiments. For example, the method includes:

receiving a synchronizing frame from a master, in which the synchronizing frame includes a first count value of a timing counter of the master;

analysing the synchronizing frame to acquire the first count value;

adjusting a TDMA slot of the slave according to the first count value and a second count value of a timing counter of the slave to synchronize the TDMA slot of the slave with a TDMA slot of the master.

According to embodiments of a seventh aspect of the present disclosure, a non-transitory computer-readable storage medium is provided. The non-transitory computer-readable storage medium has stored therein computer instructions that, when executed by a computer, cause the computer to perform a method according to embodiments as shown in FIG. 1 and other related embodiments. For example, the method includes:

receiving a synchronizing frame from a master, in which the synchronizing frame includes a first count value of a timing counter of the master;

analysing the synchronizing frame to acquire the first count value;

adjusting a TDMA slot of the slave according to the first count value and a second count value of a timing counter of the slave to synchronize the TDMA slot of the slave with a TDMA slot of the master.

Figure 9:
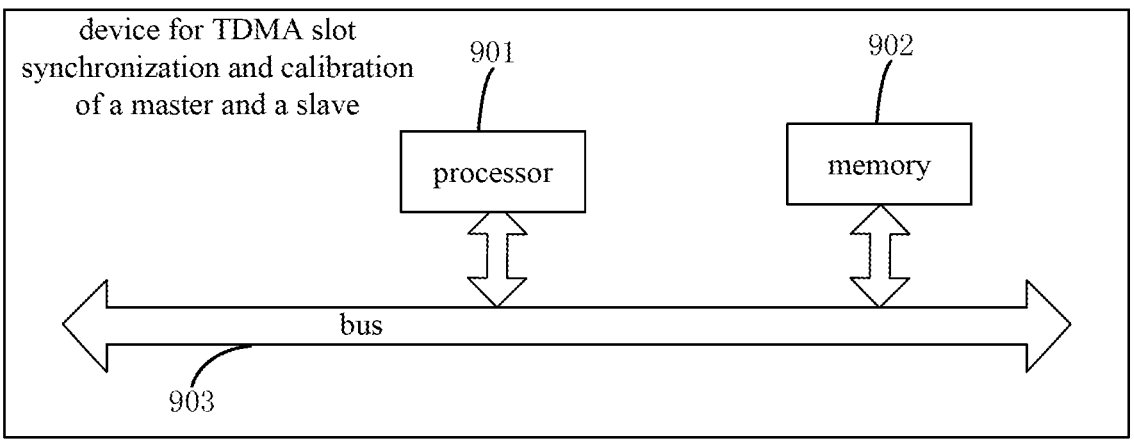
FIG. 9 is a block diagram of an apparatus for TDMA slot synchronization and calibration of a master and a slave according to a further embodiment of the present disclosure.

According to embodiments of a eighth aspect of the present disclosure, a device for TDMA slot synchronization and calibration of a master and a slave is provided in each slave. As shown in FIG. 9, the device includes at least one processor 901, and at least one memory 902 communicated with the processor 901, in which the memory 902 is configured to store program instructions executable by the processor 901, and the processor 901 is configured to call the program instructions to perform a process according to embodiments of the fourth aspect and other related embodiments of the present disclosure. For example, the process includes:

acquiring a first count value of a timing counter by the master;

reading a third count value of a compare register by the master;

performing a preset interrupting program to generate a synchronizing frame and sending the synchronizing frame to at least one slave, and controlling the timing counter to restart counting, when the first count value is equal to the third count value.

As shown in FIG. 9, in the embodiment, the processor 901 and the memory 902 are communicated with each other via a bus 903.

According to embodiments of a ninth aspect of the present disclosure, a computer program product is provided. The computer program product includes a computer program stored in a non-transitory computer-readable storage medium, in which the computer program includes program instructions that, when executed by a computer, cause the computer to perform a process according to embodiments of the fourth aspect and other related embodiments of the present disclosure. For example, the process includes:

acquiring a first count value of a timing counter by the master;

reading a third count value of a compare register by the master;

performing a preset interrupting program to generate a synchronizing frame and sending the synchronizing frame to at least one slave, and controlling the timing counter to restart counting, when the first count value is equal to the third count value.

According to embodiments of a tenth aspect of the present disclosure, a non-transitory computer-readable storage medium is provided. The non-transitory computer-readable storage medium has stored therein computer instructions that, when executed by a computer, cause the computer to perform a process according to embodiments of the fourth aspect and other related embodiments of the present disclosure. For example, the process includes:

acquiring a first count value of a timing counter by the master;

reading a third count value of a compare register by the master;

performing a preset interrupting program to generate a synchronizing frame and sending the synchronizing frame to at least one slave, and controlling the timing counter to restart counting, when the first count value is equal to the third count value.

Upon consideration of the description and actual practice of the present disclosure, it would be appreciated by those skilled in the art that other embodiments may also be realized by the present disclosure. The present disclosure is intended to cover changes, uses, or adaptations of the present disclosure which follow the general principle of the present disclosure and include common knowledges or conventional techniques in the art not disclosed in the present disclosure. The description and embodiments are only exemplary, and the true scope and spirit of the present disclosure are indicated by the following claims.

It should be understood that the present disclosure is not limited to the specific structures that have been described above and shown in the drawings, and modifications and changes may be made without departing from the scope of the present disclosure. The scope of the present application is limited by the claims.

INDUSTRIAL APPLICABILITY

According to the method provided in the embodiments of the present disclosure, the synchronizing frame generated by the master is received, then analysing is performed to acquire the first count value included in the synchronizing frame, and finally the TDMA slot of the slave is adjusted according to the first count value and the second count value of the local timing counter. It can be seen that, in the present disclosure, the synchronization is realized by directly using the respective clock sources of the master and the slave, without addition of the clock source of the RTC or the GPS module, thus reducing the cost and improving the accuracy. The present disclosure has a wide industrial applicability.

What is claimed is:

1. A method for TDMA slot synchronization and calibration of a master and a slave, comprising:
    receiving a synchronizing frame from the master by the slave, wherein the synchronizing frame includes a first count value of a timing counter of the master;
    analysing the synchronizing frame by the slave to acquire the first count value; and
    adjusting a TDMA slot of the slave according to the first count value and a second count value of a timing counter of the slave to synchronize the TDMA slot of the slave with a TDMA slot of the master;
    wherein before receiving the synchronizing frame from the master by the slave, the method further comprises:
    performing a frequency division on a clock source of the slave to determine a time granularity of the timing counter of the slave; and
    setting a third count value of a compare register of the slave.

2. The method according to claim 1, wherein adjusting the TDMA slot of the slave according to the first count value and the second count value of the timing counter of the slave comprises:
    keeping the second count value of the timing counter of the slave unchanged if a difference between the first count value and the second count value is zero;
    delaying the second count value of the timing counter of the slave by a first number A of time granularities and subsequently controlling the timing counter to restart counting if the first count value is greater than the second count value and the difference between the first count value and the second count value is the first number A; or
    subtracting a second number B from the third count value of the compare register of the slave to acquire a fourth count value and controlling the timing counter to restart counting when the second count value reaches the fourth count value if the first count value is smaller than the second count value and the difference between the first count value and the second count value is the second number B.

3. A method for TDMA slot synchronization and calibration of a master and a slave, comprising:
    acquiring a first count value of a timing counter by the master;
    reading a third count value of a compare register by the master; and
    performing a preset interrupting program to generate a synchronizing frame and sending the synchronizing frame to the slave, and controlling the timing counter to restart counting, when the first count value is equal to the third count value;
    wherein before acquiring the first count value of the timing counter by the master, the method further comprises:
    performing a frequency division on a clock source of the master to determine a time granularity of the timing counter of the master; and
    setting the third count value of the compare register of the master.

4. An apparatus for TDMA slot synchronization and calibration of a master and a slave, provided in the slave and comprising:
    at least one processor; and
    at least one memory connected with the at least one processor;
    wherein the at least one memory is configured to store program instructions executable by the at least one processor, and the at least one processor is configured to execute the program instructions to perform a method for TDMA slot synchronization and calibration of the master and the slave, comprising:
    receiving a synchronizing frame from the master by the slave, wherein the synchronizing frame includes a first count value of a timing counter of the master;
    analysing the synchronizing frame by the slave to acquire the first count value; and
    adjusting a TDMA slot of the slave according to the first count value and a second count value of a timing counter of the slave to synchronize the TDMA slot of the slave with a TDMA slot of the master;
    wherein before receiving the synchronizing frame from the master by the slave, the method further comprises:
    performing a frequency division on a clock source of the slave to determine a time granularity of the timing counter of the slave; and
    setting a third count value of a compare register of the slave.

5. The apparatus according to claim 4, wherein the adjusting the TDMA slot of the slave according to the first count value and the second count value of the timing counter of the slave comprises:
    keeping the second count value of the timing counter of the slave unchanged if a difference between the first count value and the second count value is zero;
    delaying the second count value of the timing counter of the slave by a first number A of time granularities and subsequently controlling the timing counter to restart counting if the first count value is greater than the second count value and the difference between the first count value and the second count value is the first number A; or
    subtracting a second number B from the third count value of the compare register of the slave to acquire a fourth count value and controlling the timing counter to restart counting when the second count value reaches the fourth count value if the first count value is smaller than the second count value and the difference between the first count value and the second count value is the second number B.

6. The method according to claim 1, wherein the master is provided with one clock source, the slave is provided with one clock source, and the TDMA slot of the clock source of the slave is synchronized with the TDMA slot of the clock source of the master.

7. The method according to claim 3, wherein the master is provided with one clock source, the slave is provided with one clock source, and the TDMA slot of the clock source of the slave is synchronized with the TDMA slot of the clock source of the master.

8. The apparatus according to claim 4, wherein the master is provided with one clock source, the slave is provided with one clock source, and the TDMA slot of the clock source of the slave is synchronized with the TDMA slot of the clock source of the master.

* * * * *